(12) United States Patent
Tanaka et al.

(10) Patent No.: US 8,446,717 B2
(45) Date of Patent: May 21, 2013

(54) FOLDING ELECTRONIC EQUIPMENT

(75) Inventors: Shintaro Tanaka, Osaka (JP); Akira Iwamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 240 days.

(21) Appl. No.: 12/871,991

(22) Filed: Aug. 31, 2010

(65) Prior Publication Data

US 2011/0075378 A1    Mar. 31, 2011

(30) Foreign Application Priority Data

Sep. 28, 2009   (JP) ................. 2009-222205

(51) Int. Cl.
*H05K 7/16*    (2006.01)

(52) U.S. Cl.
USPC .................. 361/679.27; 361/679.01; 16/221

(58) Field of Classification Search
USPC ............ 361/679.01, 679.02, 679.21, 679.26, 361/679.7, 679.08, 679.09, 724–727, 679.55–679.59; 248/917–924; 16/221, 402; 455/575.1–575.4; 379/433.11–433.13
See application file for complete search history.

(56) References Cited

U.S. PATENT DOCUMENTS

| 4,333,206 | A | * | 6/1982 | Lang et al. .................. 16/335 |
| 5,844,774 | A |   | 12/1998 | Gushiken et al. |
| 5,953,302 | A | * | 9/1999 | Kobayashi ................. 720/647 |
| 6,989,986 | B2 |  | 1/2006 | Kumagai et al. |

FOREIGN PATENT DOCUMENTS

| JP | 8-63258 | 3/1996 |
| JP | 9-283946 | 10/1997 |
| JP | 2008-47144 | 2/2008 |

* cited by examiner

*Primary Examiner* — Jinhee Lee
*Assistant Examiner* — Ingrid Wright
(74) *Attorney, Agent, or Firm* — Wenderoth, Lind & Ponack, L.L.P.

(57) ABSTRACT

A laptop computer includes a first chassis accommodating a display section; a second chassis accommodating an operation control section; and a hinge mechanism coupling the first and second chassis. The hinge mechanism includes a hinge bracket inside an escutcheon part of the first chassis and having a base end side coupled with a hinge axle. A slanted extension part is provided to a side edge portion of the escutcheon part from a side corresponding to a tip of the hinge bracket to a side corresponding to the base end of the hinge bracket. A slanted part which corresponds to the slant of the extension part is provided to a side edge portion of the one side of the second chassis. The hinge bracket is fixed to the first chassis with a tip portion of the hinge bracket abutting a slanted back surface of the extension part.

1 Claim, 5 Drawing Sheets

FOLDING ELECTRONIC EQUIPMENT

BACKGROUND OF THE INVENTION

The present invention relates to an openable and closable folding electronic equipment, for example a laptop personal computer (hereinafter called "laptop PC" as an abbreviated expression, appropriately), specifically to a structure of a hinge portion in such a folding electronic equipment.

As is well known, the chassis of the openable and closable folding electronic equipment such as a laptop PC and the like, is constituted by a display section side chassis (hereinafter called a "first chassis", appropriately) which accommodates the display section having a display screen such as a liquid crystal type display screen and an operation control section side chassis (hereinafter called a "second chassis", appropriately) which accommodates the operation control section capable of generating a display signal which is to be inputted into the display section. Both chassis are coupled together by a hinge mechanism in a relatively openable and closable manner. In more detail, both the first chassis and the second chassis are usually formed to a substantially rectangle shape in a planar view, and each one side (a rear side from a user's view in a state where the user uses the electronic equipment) of the first and the second chassis are coupled together via a hinge mechanism, such that both chassis can perform relative opening and closing motions around a hinge axle. It is to be noted that the operation control section includes an input device such as a keyboard, signal processing circuits for generating display signals outputted to the display section based on input operations by the input device, a central processing unit (so-called CPU), and peripheral components thereof.

As the hinge mechanism used for such an openable and closable folding electronic equipment, a hinge mechanism is constituted to support the first chassis of the display section side by a hinge bracket, as disclosed in Japanese Patent Laid-open Publication No. 2008-47144.

In general, a so-called the escutcheon part which forms a trimming is provided between an outer periphery of the first chassis of the display section side and a glass plate of the display screen. The escutcheon part is usually formed to be flat from the outer periphery of the first chassis to an outer periphery of the display screen.

When using a hinge bracket for supporting the first chassis, as shown by imaginary lines (chain double-dashed lines) in FIG. 8, for example, it is conceivable to arrange a hinge bracket 122 of which the base end side is coupled with a hinge axle on a back surface side of a side edge portion of the escutcheon part 114 of the first chassis 111, and to fix the hinge bracket 122 to a side portion of the first chassis 111 so that a surface of the escutcheon part 114 can face to and abut a face (hereinafter called a "principal surface", appropriately) of the second chassis on which the input device is arranged and which is parallel to the glass plate of the display screen in the first chassis 111. In this case, from a view point of aiming to make the electronic equipment thinner by reducing the height thereof in a folded state (the fold height) as much as possible, it is quite usual to fix the hinge bracket 122 to a side portion of the first chassis 111 in a state where a side portion (lower side portion in FIG. 8) of the hinge bracket 122 which corresponds to the back surface of the escutcheon part abuts the back surface of the side edge portion of the escutcheon part 114.

However, in the above-mentioned construction (refer to the imaginary lines in FIG. 8), the lower side portion of the hinge bracket 122 abuts the back surface of the side edge portion of the flat escutcheon part 114. Accordingly, in a folded state of the electronic equipment where the first chassis 111 and the second chassis 131 are closed together, the lower side portion of the hinge bracket 122 is positioned above a substantially horizontal upper edge of the one side of the second chassis 131 in parallel to the upper edge (that is, in parallel to the principal surface of the second chassis 131). As the result, the first chassis 111 overlaps the second chassis 131 in a parallel fashion. Therefore, in this case, the fold height H1 of the electronic equipment is determined by adding the height of the first chassis to the height of the second chassis in unchanged form. This is a bottleneck in further reducing the fold height H1 of the electronic equipment and aiming to make the electronic equipment even thinner.

Also, in the above-mentioned construction (refer to the imaginary lines in FIG. 8), when an impact load is applied to the first chassis 111 from the side, the inputted impact load reaches, as it is, to the hinge mechanism via the side surface of the first chassis 111. Therefore, the hinge mechanism including the hinge bracket 122 must be sufficiently firm so that it has sufficient strength to endure such an impact load. This may bring disadvantages in aiming to make the electronic equipment even lighter and thinner.

SUMMARY OF THE INVENTION

The present invention was made in view of the foregoing technical problems. A basic object of the present invention is to enable as much as possible reduction of the fold height of the electronic equipment in the state where the first chassis and the second chassis are closed together, and also to enable reduction of the impact load that reaches the hinge mechanism when an impact load is applied from the side to the first chassis of the electronic equipment in the folded state.

Therefore, an electronic equipment according to the present invention includes: a first chassis accommodating a display section so as to cover a periphery and a back face of the display section, and having a substantially rectangular shape in a planar view; a second chassis accommodating an operation control section capable of generating a display signal to be inputted into the display section, and having substantially rectangular shape in a planar view; and a hinge mechanism for coupling one side of the second chassis and one side of the first chassis and supporting both chassis in a relatively openable and closable manner. And, the hinge mechanism includes a hinge bracket of which a base end side is coupled with a hinge axle, the hinge bracket being disposed inside an escutcheon part of the first chassis and supports the first chassis. Also, an extension part which extends at a slant from a flat portion of the escutcheon part is provided to a side edge portion of the escutcheon part from a side corresponding to a tip of the hinge bracket to a side corresponding to the base end of the hinge bracket, and a slanted part which corresponds to the slant of the extension part is provided to a side edge portion of the one side of the second chassis. Further, the hinge bracket is fixed to a side portion of the first chassis in a state where a tip portion of the hinge bracket abuts a slanted back surface of the extension part of the escutcheon part.

In the present invention, a hinge bracket for supporting the first chassis is disposed inside the escutcheon part of the first chassis, and an extension part which extends at a slant from a flat portion of the escutcheon part is provided to a side edge portion of the escutcheon part from a side corresponding to a tip of the hinge bracket to a side corresponding to the base end of the hinge bracket, and a slanted part which corresponds to the slant of the extension part is provided to a side edge portion of the one side of the second chassis. Further, the hinge bracket is fixed to a side portion of the first chassis in a state where a tip portion of the hinge bracket abuts a slanted back surface of the extension part of the escutcheon part.

Accordingly, in the state where the first chassis and the second chassis are closed together, the tip portion of the hinge bracket is positioned to a lower level by following to the slant of the back surface of the extension part, compared with the conventional case in which the lower side of the hinge bracket abuts the back surface of the side edge portion of the flat portion of the escutcheon part. Thereby, it is possible to place the hinge bracket to a lower position in a folded state of the electronic equipment, reducing the fold height thereof and making it even thinner.

In an embodiment of the present invention, it is preferable that a step part having a vertical wall is provided to the side edge portion of the one side of the second chassis, the vertical wall receiving an inner side surface of the extension part provided to the side edge portion of the escutcheon part in a state where the first chassis is closed together with the second chassis.

According to this construction, when an impact load is applied to the first chassis of the electronic equipment in the folded state from the side thereof and/or the hinge axle side, the impact load is received by the vertical wall of the step part via the inner side surface of the extension part, and does not reach the hinge mechanism as it is. Thereby, it is possible to reduce the impact load that reaches the hinge mechanism.

BRIEF DESCRIPTION OF THE DRAWINGS

The present invention will be described in detail with reference to the accompanying drawings.

DETAILED DESCRIPTION OF THE PREFERRED EMBODIMENTS

Hereinafter, an embodiment of the present invention will be explained in detail, by taking a so-called laptop PC as an example, with reference to the accompanying drawings.

In the following description, some terms which respectively indicate specific directions ("up", "down", "left", "right" and other terms include their concept, "clockwise direction", "counter-clockwise direction", for example) may be used. However, it is to be noted that those terms are used to facilitate understanding of the present invention with reference to the accompanying drawings. And, the present invention should not be interpreted in a limited way by meanings of those terms.

Figure 1:
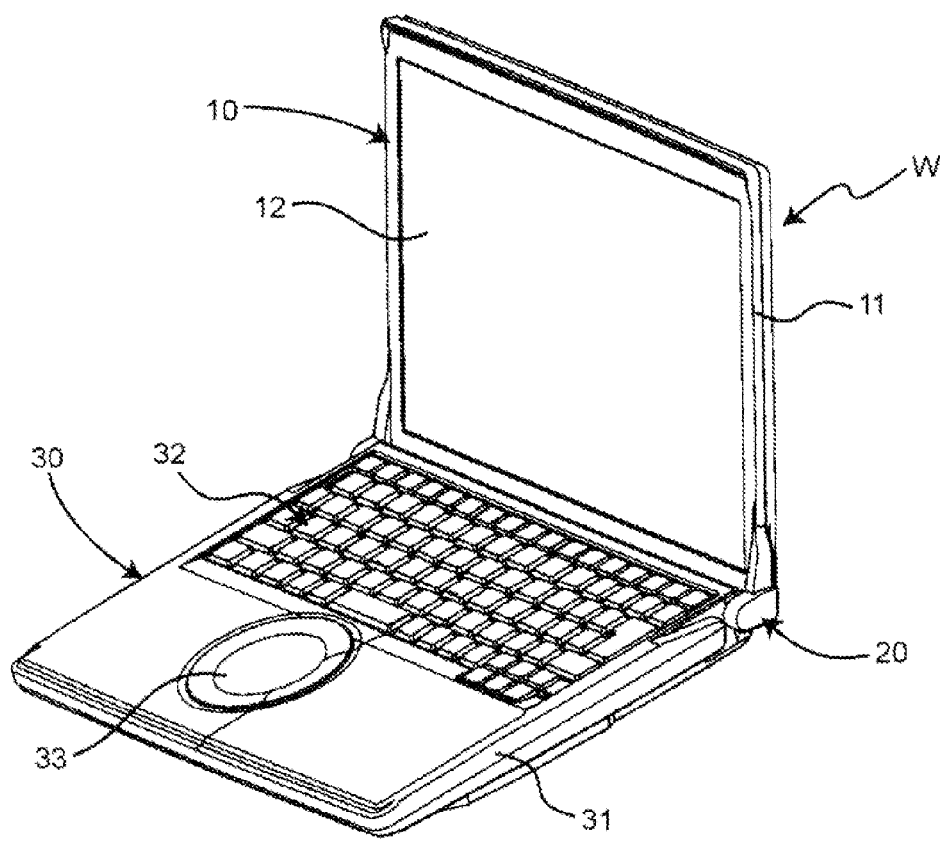
FIG. 1 is an overall perspective view of a laptop PC according to an embodiment of the present invention in an enabled state.
Figure 2:
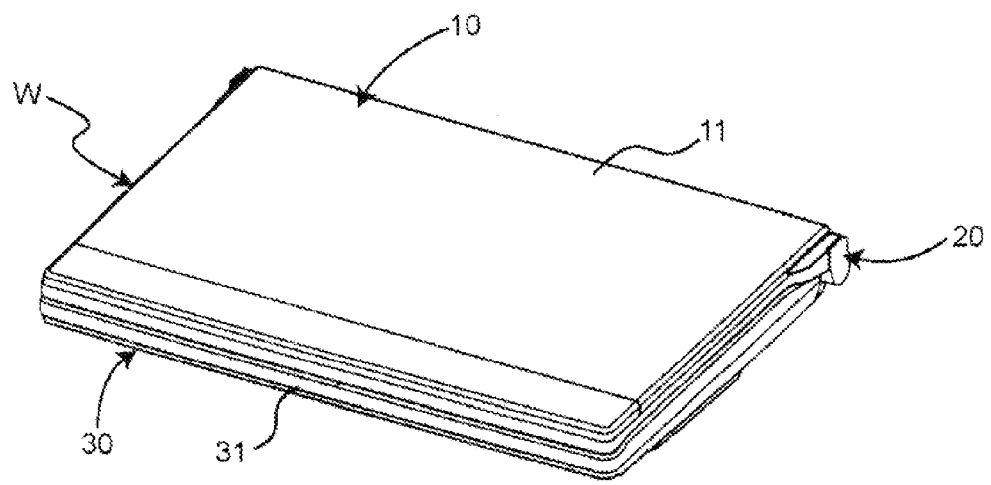
FIG. 2 is an overall perspective view of the laptop PC in a nonuse (closed) state.
Figure 3:
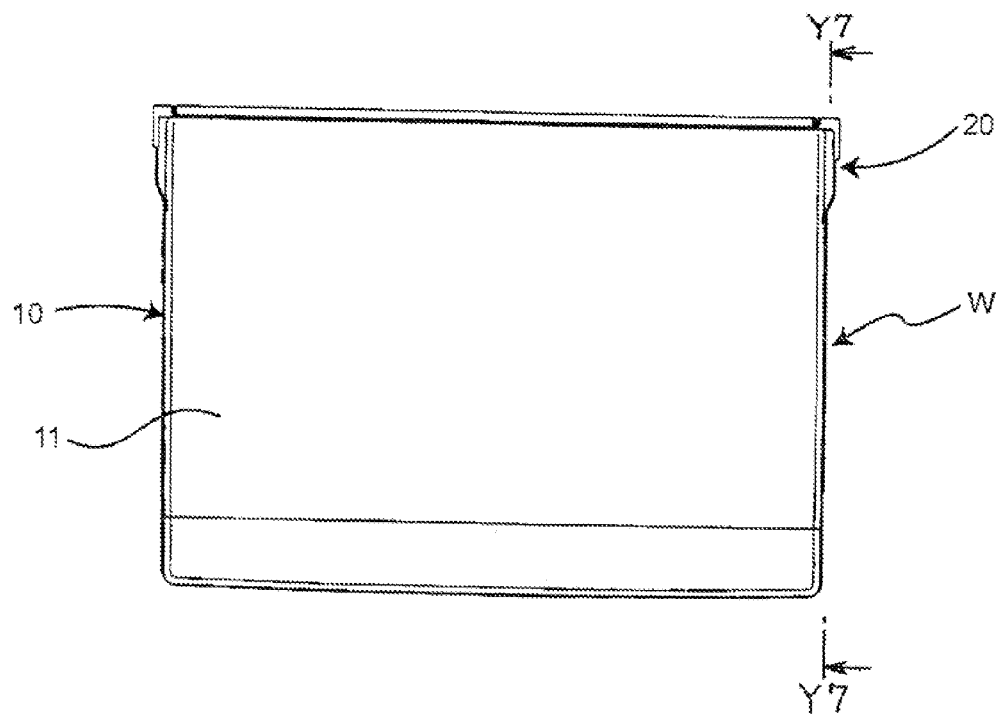
FIG. 3 is a plane view of the laptop PC in a nonuse (closed) state.
Figure 4:
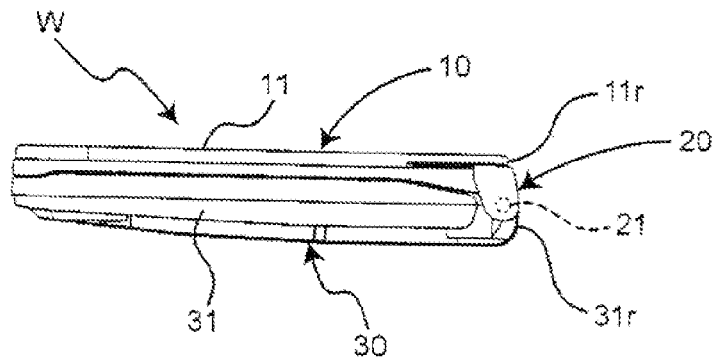
FIG. 4 is a side view of the laptop PC in a nonuse (closed) state.

FIGS. 1 and 2 are perspective views showing the laptop PC according to the present embodiment in an enable state and a nonuse (closed) state. And, FIGS. 3 and 4 are a plane view and a side view of the laptop PC in the nonuse (closed) state.

As shown in these drawings, the laptop PC W as an electronic equipment according to the present invention is provided with a display section 10 having a display screen 12 such as a liquid crystal type display screen, and an operation control section 30 capable of generating a display signal which is to be inputted into the display section 10. The operation control section 30 includes an input device 32 such as a keyboard, signal processing circuits for generating display signals outputted to the display section based on input operations by the input device, a central processing unit (a so-called CPU: not shown), and peripheral components thereof (also, not shown). Also, a touch-pad is provided on a near side as viewed by a user in a state in which the user operates the laptop PC W. The user can conduct a cursor motion, a scroll of the display screen 12 and the like only by going over the touch-pad from right to left or up and down with the finger.

The display section 10 is accommodated in a chassis 11 (a first chassis) for the display section side, and a periphery and a back face of the display section 10 are covered by the first chassis. On the other hand, the operation control section 30 is accommodated in a chassis 31 (a second chassis) for the operation control section side. And both the chassis are coupled to each other by a hinge mechanism 20 in a relatively openable and closable manner.

In more detail, both the first chassis 11 and the second chassis 31 have an overall basic shape of substantially rectangle in a plan view (that is, in a state of as viewed from the front side thereof). And, one side 11r of the first chassis 11 and one side 31r of the second chassis 31 (that is, both the rear sides as viewed from the user in a state that the laptop PC W is folded) are coupled via the hinge mechanism 20. Thereby, the first chassis 11 and the second chassis 31 can move in a relatively openable and closable manner around a hinge axle 21 (refer to FIG. 4).

It is to be noted that the term "rectangle" includes a "square" as one configuration thereof in the present specification.

Figure 5:
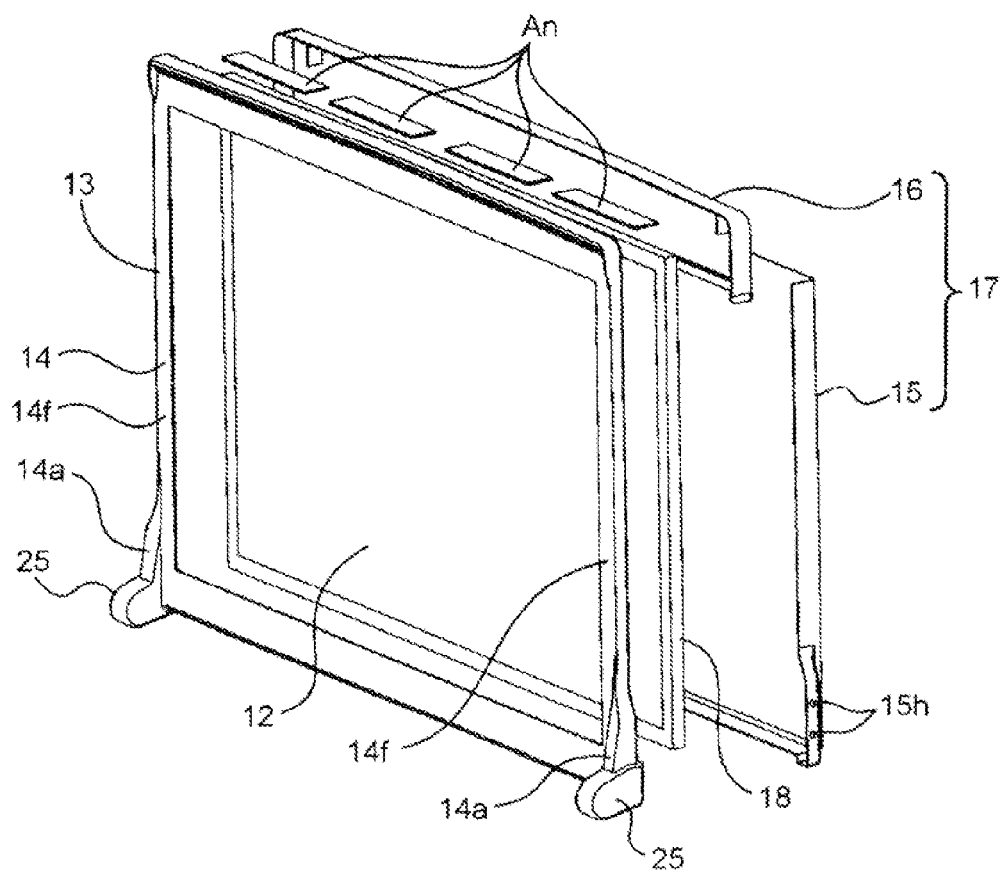
FIG. 5 is an exploded perspective view schematically showing the constitution of the first chassis of the laptop PC.

FIG. 5 is an exploded perspective view schematically showing the constitution of the first chassis 11. As shown in this figure, the first chassis 11 consists of a base frame 13 which forms a quadrate frame in a front view, a back panel 15 disposed facing the base frame 13 and an upper cover 16 which is joined to an upper section of the back panel 15. A liquid-crystal panel 18 of which the surface is covered with a glass plate is held between the base frame 13 and the back panel 15 with the upper cover 16. An outer panel 17 of the first chassis 11 is formed by integrally joining the back panel 15 and the upper cover 16 to each other.

The back panel 15 is, preferably, made of metal such as magnesium, and the base frame 13 is, preferably, made of plastic. As shown in FIG. 5, when wireless communication antennas An are disposed in the first chassis 11, plastic material is used for the portions of the back panel 15 on which the wireless communication antennas An are disposed, in order to shield the radio signals transmitted and received. A pair of threaded holes 15h for fixing by fastening a hinge bracket discussed below is provided at the side portion of a base end side (the lower side in FIG. 5) of the metal back panel 15. It is to be noted that also the major portions of the second chassis 31 are, preferably, made of metal such as magnesium.

A cover member 25 (hinge cover) of the hinge mechanism 20 is integrally formed at the right and left ends of the base end side (the lower side in FIG. 5) of the base frame 13. Such a hinge cover 25 may be provided separately from the base frame 13. A front surface of the frame body of the base frame 13 is so-called escutcheon part 14 which forms a border part positioned between an outer periphery of the first chassis 11 and the glass plate of the display screen 12 in an assembled state of the display section 10. The escutcheon part 14 is to play the roll of a kind of decorative panel.

Figure 6:
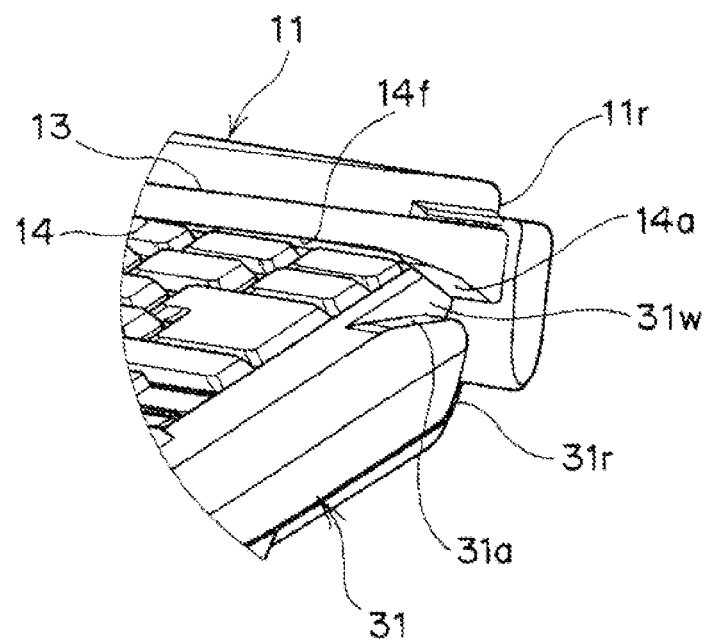
FIG. 6 is a perspective view showing a hinge connection part between the first chassis and the second chassis in a half-open state of the laptop PC.
Figure 7:
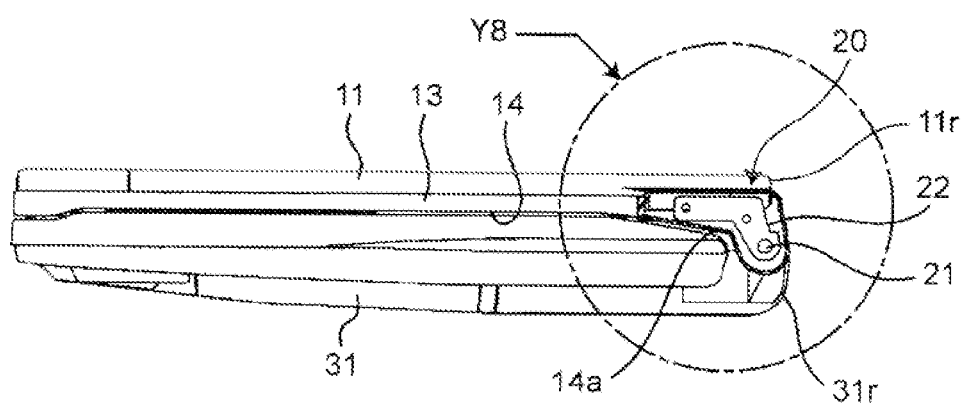
FIG. 7 is a vertical cross-sectional view taken along a line Y7-Y7 in FIG. 4.

FIG. 6 is a perspective view showing a hinge connection part between the first chassis and the second chassis in a half-open state of the laptop PC. FIG. 7 is a vertical cross-sectional view taken along a line Y7-Y7 in FIG. 4. And, FIG. 8 is an enlarged cross-sectional view showing in close-up a major portion (Y8 portion) of FIG. 7.

Figure 8:
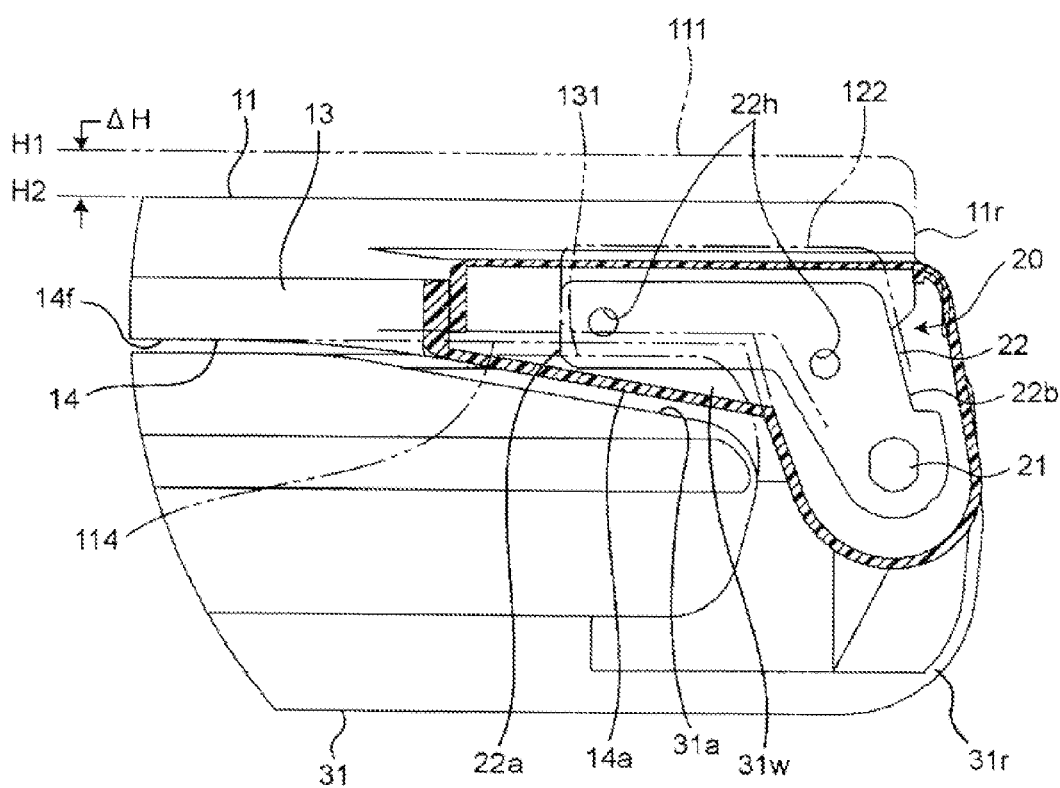
FIG. 8 is an enlarged cross-sectional view showing in close-up a major portion (Y8 portion) of FIG. 7.

As shown in FIGS. 7 and 8, in the present embodiment, the hinge mechanism 20 for coupling the first chassis 11 and the second chassis 31 in the relatively openable and closable manner is provided with a hinge bracket 22 of which the base end side is connected to the hinge axle 21. The hinge bracket 22 is, preferably, made of metal and supports the first chassis 11. The hinge bracket 22 is formed as a plate-like member having a substantially L-shape in a side view, and is disposed inside the escutcheon part 14 of the base frame 13 of the first chassis 11.

In the present embodiment, a side edge portion of the escutcheon part 14 is not flat. And, an extension part 14a which extends at a slant from a flat portion 14f of the escutcheon part 14 is provided to the side edge portion of the escutcheon part 14 from a side corresponding to a tip 22a of the hinge bracket 22 to a side corresponding to the base end of the hinge bracket 22. In a folded state of the laptop PC W as shown in FIGS. 7 and 8, the extension part 14a extends to slant obliquely downward from the side (left side in FIGS. 7 and 8) corresponding to a tip 22a of the hinge bracket 22 to the side (right side in FIGS. 7 and 8) corresponding to the base end of the hinge bracket 22.

On the other hand, a slanted part 31a which corresponds to the slant of the extension part 14a is provided to a side edge portion of the one side 31r of the second chassis 31. Also, a vertical wall 31w for receiving an inner side surface of the extension part 14a in a state where the first chassis 11 is closed together with the second chassis 31 is formed at the side edge portion of the one side 31r of the second chassis 31. The vertical wall 31w and the slanted part 31a constitute a step for receiving the inner side surface and the slanted surface of the extension part 14a.

The hinge bracket 22 is fixed to a side portion of one side 11r of the first chassis 11 in a state where a tip portion 22a of the hinge bracket 22 abuts a slanted back surface of the extension part 14a of the escutcheon part 14. More specifically, a pair of through holes 22h for threaded screws is provided in the hinge bracket 22. Predetermined screw members (not shown) are inserted into the through holes 22h, and then the screw members are fastened into the threaded holes 15h (refer to FIG. 5) provided at the side portion of the base end side of the metal back panel 15, and thereby, the hinge bracket 22 is fixed by fastening to the side portion of one side 11r of the first chassis 11.

As described above, according to the present embodiment, the hinge bracket 22 for supporting the first chassis 11 is disposed inside the escutcheon part 14 of the first chassis 11, and the extension part 14a which extends at a slant from the flat portion 14f of the escutcheon part 14 is provided to a side edge portion of the escutcheon part 14 from a side corresponding to a tip 22a of the hinge bracket 22 to a side corresponding to the base end 22b of the hinge bracket 22, and a slanted part 31a which corresponds to the slant of the extension part 14a is provided to a side edge portion of the one side 31r of the second chassis 31. Further, the hinge bracket 22 is fixed to a side portion of the first chassis 11 in the state where the tip portion 22a of the hinge bracket 22 abuts on a slanted back surface of the extension part 14a of the escutcheon part 14.

In the conventional construction, as shown by the imaginary lines (chain double-dashed lines) in FIG. 8, the escutcheon part 114 is formed to be flat all over to the base end side thereof, and the hinge bracket 122 is fixed to the side portion of the first chassis 111 in the state that the lower side portion of the hinge bracket 122 abuts the back surface of the side edge portion of the flat escutcheon part 114. Accordingly, in a folded state of the laptop PC where the first chassis 111 and the second chassis 131 are closed together, the lower side portion of the hinge bracket 122 is positioned above a substantially horizontal upper edge of the one side of the second chassis 131 in substantially parallel to the upper edge. As the result, the first chassis 111 overlaps the second chassis 131 in a parallel fashion. Therefore, in this conventional case, the fold height H1 of the laptop PC is determined by adding the height of the first chassis 111 to the height of the second chassis 131 in unchanged form. This is a bottleneck in further reducing the fold height H1 of the laptop PC and aiming to make the laptop PC even thinner.

In contrast, according to the present embodiment, the hinge bracket 22 is fixed to a side portion of the first chassis 11 in the state where the tip portion 22a of the hinge bracket 22 abuts a slanted back surface of the extension part 14a of the escutcheon part 14. Accordingly, in the state where the first chassis 11 and the second chassis 31 are closed together, the tip portion 22a of the hinge bracket 22 is positioned to a lower level by following to the slant of the back surface of the extension part 14a, comparing with the conventional case in which the lower side of the hinge bracket abuts the back surface of the side edge portion of the flat portion of the escutcheon part. Thereby, it is possible to place the hinge bracket 22 to a lower position in a folded state of the laptop PC W, compared with the conventional case, and to reduce the fold height H2 thereof by a difference ΔH compared with the conventional case, and making it even thinner.

Also, in the conventional construction (refer to the imaginary lines in FIG. 8), when an impact load is applied to the first chassis 111 from the side, the inputted impact load reaches, as it is, to the hinge mechanism via the side surface of the first chassis 111. Therefore, the hinge mechanism including the hinge bracket 122 must be sufficiently firm so that it has a sufficient strength to endure such an impact load. This may bring disadvantages in aiming to make the electronic equipment even lighter and thinner.

In contrast, according to the present embodiment, a slanted part 31a which corresponds to the slant of the extension part 14a is provided to a side edge portion of the one side 31r of the second chassis 31. Also, a vertical wall 31w for receiving an inner side surface of the extension part 14a in a state where the first chassis 11 is closed together with the second chassis 31 is formed at the side edge portion of the one side 31r of the second chassis 31. Accordingly, when an impact load is applied to the first chassis 11 of the laptop PC W in the folded state from the side thereof and/or the hinge axle side, the impact load is received by the vertical wall 31w via the inner side surface of the extension part 14a, and does not reach to the hinge mechanism 20 as it is. Thereby, it is possible to reduce the impact load that reaches the hinge mechanism 20. As the result, the hinge mechanism including the hinge bracket 22 does not need to be excessively firm, and thereby it becomes possible to make the laptop PC W even lighter and thinner.

It is to be noted that although the above described embodiment exemplify a laptop PC, the present invention is not limited to the above-described embodiment, and is effectively applicable to various other folding electronic equipment having a first chassis accommodating a display section and a second chassis accommodating an operation control section.

The present invention is not limited to the above-described embodiment and variations thereof, and various modifications and changes may be made without departing from the spirit and scope of the invention.

The present invention can be utilized as a structure of a hinge portion of the chassis in a folding electronic equipment such as a laptop personal computer.

What is claimed is:

1. A folding electronic equipment comprising:

a first chassis accommodating a display section so as to cover a periphery and a back face of the display section, and having a substantially rectangular shape in a planar view;

a second chassis accommodating an operation control section capable of generating a display signal to be inputted into the display section, and having a substantially rectangular shape in a planar view; and a hinge mechanism for coupling one side of the second chassis and one side of the first chassis and supporting both chassis in a relatively openable and closable manner;

wherein the hinge mechanism includes a hinge bracket of which a base end side is coupled with a hinge axle, the hinge bracket being disposed inside an escutcheon part of the first chassis and supports the first chassis;

wherein an extension part which extends at a slant from a flat portion of the escutcheon part is provided to a side edge portion of the escutcheon part from a side corresponding to a tip of the hinge bracket to a side corresponding to the base end of the hinge bracket, and a slanted part which corresponds to the slant of the extension part is provided to a side edge portion of the one side of the second chassis;

wherein the hinge bracket is fixed to a side portion of the first chassis in a state where a tip portion of the hinge bracket abuts slanted back surface of the extension part of the escutcheon part; and wherein a step part having a vertical wall is provided to the side edge portion of the one side of the second chassis, the vertical wall receiving an inner side surface of the extension part provided to the side edge portion of the escutcheon part in a state where the first chassis is closed together with the second chassis.

* * * * *